July 16, 1968  N. SPIELBERG  3,393,314

METHOD OF OBTAINING X-RAY INTERFERENCE PATTERNS

Filed Sept. 8, 1967

INVENTOR.
NATHAN SPIELBERG

BY

AGENT

United States Patent Office 3,393,314
Patented July 16, 1968

3,393,314
METHOD OF OBTAINING X-RAY INTERFERENCE PATTERNS
Nathan Spielberg, Hartsdale, N.Y., assignor to North American Philips Co., Inc., New York, N.Y., a corporation of Delaware
Continuation-in-part of application Ser. No. 444,547, Apr. 1, 1965. This application Sept. 8, 1967, Ser. No. 666,390
3 Claims. (Cl. 250—51.5)

ABSTRACT OF THE DISCLOSURE

A method of obtaining an X-ray interference pattern in which a monochromatic coherent beam of X-rays is incident upon a first relatively thick, highly perfect crystal exhibiting the Borrmann effect. Two rays are diffracted by the crystal at least one of which is allowed to impinge upon a second such crystal exhibiting the Borrmann effect. Two rays are diffracted by the latter crystal, one of which intersects the first ray at a small controllable angle after it is suitably deviated by a small amount from its original direction by either total reflection or by refraction. Material inserted in the path of one of the intersecting rays causes a phase displacement thereof relative to the other intersecting ray with the consequence that interference occurs at the point of intersection of the two rays.

---

Figures 1, 1A:
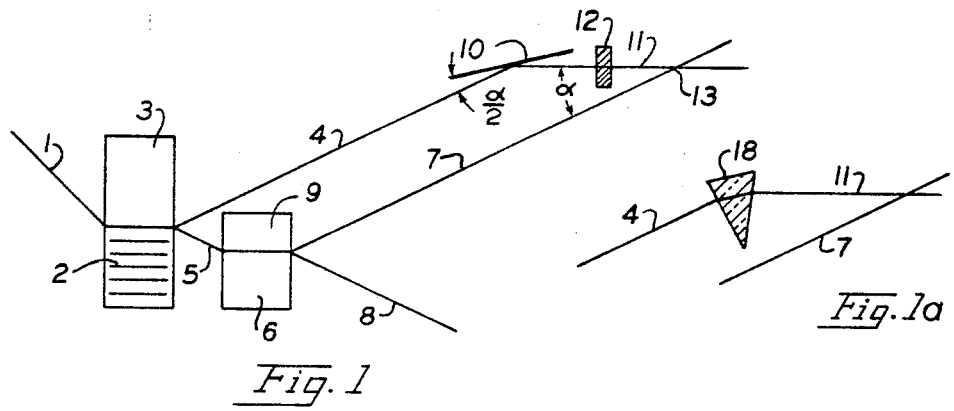

This application is a continuation-in-part of application Ser. No. 444,547, filed Apr. 1, 1965.

The invention relates to a method of obtaining an X-ray interference pattern which may be employed as a hologram and scanned with coherent visible or infra-red radiation to produce a magnified optical image of an object.

In the above-identified parent application a method of obtaining an X-ray interference pattern is disclosed in which two rays of coherent, monochromatic X-radiation are incident upon two parallel, spaced sets of crystal planes and are diffracted. A pair of rays are diffracted for each of the incident rays, of which two rays, one from each pair, converge at a common point. By inserting a material object in the path of one of the rays, the phase relationship between the two converging rays is altered and interference takes place between the rays at the point of convergence. By placing a recording medium such as a film at the point of convergence, an interference pattern may be recorded which can serve as a hologram. This hologram may then be scanned with coherent visible or infra-red radiation to produce a magnified visible image of the object.

The invention provides an alternative method for obtaining an X-ray interference pattern which has the advantage that the angle of convergence is controllably small, in the range from a few seconds to a few minutes of arc, with the result that interference fringe spacings are very greatly increased over the former method, thereby reducing the resolution requirement of the recording medium. The invention also utilizes the Borrmann effect but instead of using converging Borrmann diffracted rays, parallel rays are used. One of the parallel rays is deflected at a small angle by a refracting wedge or, preferably by total reflection at grazing incidence with a sufficiently smooth surface.

In accordance with the invention, a monochromatic coherent beam of X-rays is incident upon a first relatively thick, highly-perfect crystal exhibiting the Borrmann effect. Two separate rays are diffracted by the crystal lattice planes, at least one of which is incident on a second crystal of similar nature. Two rays are also diffracted by the latter crystal, one of which is parallel to the other of the two rays diffracted by the first crystal. One of these two parallel rays is deflected by either refraction or grazing incidence total reflection so that it will intersect the other parallel ray at a small angle. By inserting an object in the path of one of these rays, the phase relationship between the two intersecting rays can be altered so that interference occurs at the point of intersection. By placing a film or other suitable recording medium at the point of intersection, a hologram is obtained which can be scanned with coherent visible or infra-red radiation to produce a magnified visible image of the object.

In another embodiment, the other diffracted ray from the first crystal is also allowed to impinge on the second crystal from which two diffracted rays are also obtained. By selecting one of each pair of diffracted rays from the second crystal so as to obtain a pair of parallel rays and deflecting one ray of that pair to intersect the other ray, an interference pattern may also be obtained.

Figure 2:
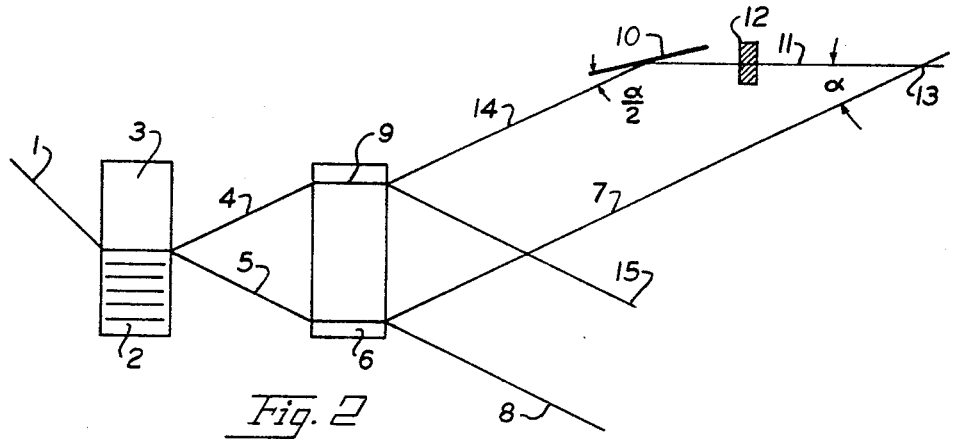
Figure 3:
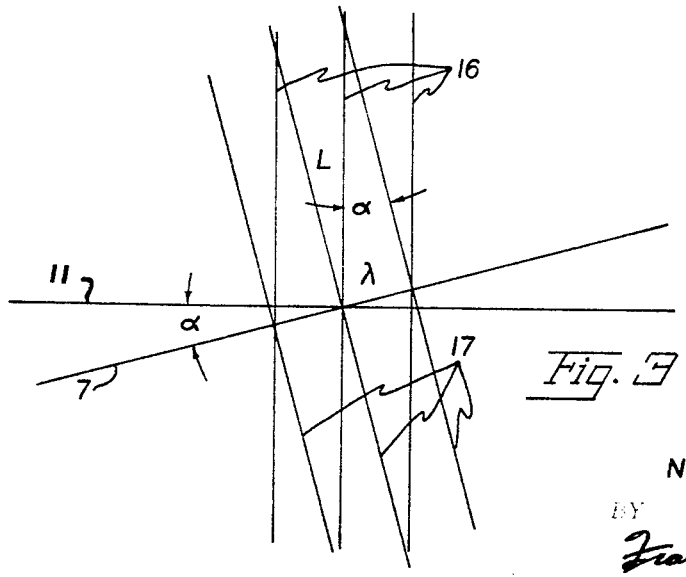

The invention will be described with reference to the accompanying drawing in which,
FIG. 1 shows one embodiment of the invention;
FIG. 1a is a modification of FIG. 1;
FIG. 2 shows another embodiment of the invention; and
FIG. 3 shows the interfering wave fronts obtained in accordance with the invention.

Referring to the drawing, a monochromatic beam of X-rays 1 is diffracted by a set of crystal lattice planes 2 of crystal 3, i.e., the 220 planes of silicon, which is relatively thick, highly-perfect and exhibits the Borrmann effect, thereby giving rise to a reflected diffracted ray 4 and a forward diffracted ray 5. Ray 5 is incident on a second relatively thick, highly-perfect crystal 6 exhibiting the Borramnn effect. As in crystal 3, two rays 7 and 8 are also diffracted by crystal lattice planes 9 within the crystal.

Ray 4 from the first crystal is incident at grazing incidence angle $\frac{1}{2}\alpha$ on a totally reflecting surface 10, so that reflected ray 11 intersects ray 7 forming an angle $\alpha$ therewith.

A material body 12 in the path of ray 11 serves to change the phase of ray 11 relative to ray 7 (both are the same wavelength having originated from a monochromatic X-ray beam 1). Consequently, there will be interference of the two rays 7 and 11 at the point of intersection 13. If a film (not shown) is positioned at 13 an interference pattern will be recorded which can serve as a hologram of object 12. This hologram may be scanned with coherent visible or infra-red radiation to produce a magnified visible image of the object.

FIG. 1a shows the use of a refracting wedge 18 in place of the totally reflecting surface 10 and the refracted ray 11 may then intersect with the ray 7 at point 13.

In FIG. 2, ray 4 is also incident upon crystal 6 where it is diffracted by the set of crystal planes 9. As a result, two rays 14 and 15 emerge from the crystal. However, in this case, ray 14 is deflected by reflector 10 to intersect with ray 11.

FIG. 3 shows the interfering wave-fronts obtained in either case shown in FIGS. 1 and 2. Ray 11 (FIG. 1) has wave-fronts 16 which intersect wave-fronts 17 of ray 7 at point 13 at the angle $\alpha$. The periodicity of the standing wave field as seen along either rays 11 and 7 is given by $L=\lambda/\sin\alpha$, where $\lambda$ is the wave-length and $L$ the distance between interferences. Thus, for X-rays having $\lambda=1$ A. and $\alpha=10^{-4}$ radians, $L=10^{-4}$ cm.$=1$ micron, which would be resolvable on a high resolution photographic plate.

What is claimed is:

1. A method of obtaining an X-ray interference pattern comprising the steps, directing a beam of monochromatic, coherent X-rays at a first highly perfect, relatively thick crystal to diffract from the crystal lattice planes thereof two rays, directing at least one of the rays at a second highly-perfect, relatively thick crystal to diffract from the crystal lattice planes thereof two rays one of which is substantially parallel to the other ray diffracted by said first crystal, deflecting one of said parallel rays to intersect the other at a common point, and inserting in the path of one of said intersecting rays a material body which alters the phase of the waves in the two intersecting rays so that an interference pattern is produced at said common point.

2. A method of obtaining X-ray interference patterns as claimed in claim 1 in which said other ray diffracted by said first crystal is directed at said second crystal where two rays corresponding thereto are diffracted by said crystal, and selecting one of said latter rays parallel to a ray in said first set diffracted by said second crystal.

3. A method of obtaining an X-ray interference pattern as claimed in claim 1 in which the one parallel ray is deflected to intersect with the other parallel ray at a very small angle.

No references cited.

WILLIAM F. LINDQUIST, *Primary Examiner.*

While the invention has been described with reference to particular embodiments and applications thereof other modifications will be readily apparent to those skilled in the art without departing from the spirit and scope of the invention which is defined in the appended claims.